United States Patent [19]

Cheysson et al.

[11] 3,925,204
[45] Dec. 9, 1975

[54] LIQUID SEPARATING EQUIPMENT

[75] Inventors: Philippe Jean-Marie Cheysson, Sainte Adresse; Paul Jean Verney; Michel Alain Coquard, both of Le Havre, all of France

[73] Assignee: Exxon Research & Engineering Co., Linden, N.J.

[22] Filed: Mar. 29, 1973

[21] Appl. No.: 346,056

[30] Foreign Application Priority Data
Mar. 30, 1972 France .................. 72.11324

[52] U.S. Cl. ............. 210/73; 210/84; 210/187; 210/195; 210/257; 210/512 R
[51] Int. Cl.² ........................... B01D 17/02
[58] Field of Search ......... 210/73, 83, 84, 242, 257, 210/512, 513, 519, 187, 195, 197, 533, 538

[56] References Cited
UNITED STATES PATENTS

| | | | |
|---|---|---|---|
| 1,107,391 | 8/1914 | Welch | 210/242 |
| 1,450,545 | 4/1923 | Hans | 210/538 X |
| 1,481,901 | 1/1924 | Hapgood | 210/83 X |
| 1,530,077 | 3/1925 | Haynes | 210/533 |
| 2,016,642 | 10/1935 | Lincoln | 210/512 X |
| 2,140,289 | 12/1938 | Hurtt et al. | 210/167 X |
| 2,167,160 | 7/1939 | Raymond | 210/512 X |
| 2,468,069 | 4/1949 | Hunter | 210/83 X |
| 2,565,343 | 8/1951 | Benham | 210/512 |
| 2,777,581 | 1/1957 | Unthank | 210/187 X |
| 3,764,008 | 10/1973 | Darley et al. | 210/84 X |
| 3,876,540 | 4/1975 | Falxa | 210/242 X |

FOREIGN PATENTS OR APPLICATIONS

| | | | |
|---|---|---|---|
| 965,504 | 9/1950 | France | 210/187 |
| 1,207,154 | 11/1969 | United Kingdom | 210/242 |

*Primary Examiner*—Samih N. Zaharna
*Assistant Examiner*—Robert G. Mukai

[57] ABSTRACT

Mixtures of liquids of differing densities (particularly oily ballast water from marine tankers) are at least partially separated by passing the mixtures into a tank, beneath the surface of a layer of liquid in the tank, and skimming off a top layer of the contained liquid by means of a weir which is maintained at a predetermined distance beneath the liquid surface by means of floats. The incoming liquid is preferably injected tangentially into the tank, relatively pure heavy liquid being withdrawn at the bottom of the liquid layer and discharged, the lighter liquid passing over the weir optionally being further resolved in a separator, and any heavy liquid thus separated being discharged, or more preferably recycled to the tank with tangential entry beneath the liquid layer to dilute the polluted liquid in the tank and promote separation.

17 Claims, 4 Drawing Figures

LIQUID SEPARATING EQUIPMENT

The present invention relates to the separation, partially or substantially completely, of liquids of different densities from a mixture of liquids, and is more particularly, although not exclusively, concerned with methods and apparatus for the semi-continuous separation of water polluted by hydrocarbons.

In the following description, reference will be made mainly to the treatment for separation of hydrocarbons from water, but it will be appreciated that the invention has wider fields of application than this.

The continuous treatment is known of water polluted by hydrocarbons or other substances that are not miscible with water and having a density lower than that of water, in separators which act in most cases, through the effect of gravity on differences of density and through the effect of walls or baffles between which purification takes place.

It is also known to separate substantially water-free oil from a mixture of oil and water by means of a skimming device having one or more overflow weirs leading to off-take pipes, and buoyancy tanks, the buoyancy being adjusted so that the weir(s) will be submerged in liquid when the liquid density corresponds to that of substantially water-free oil and so that the weirs will be above the water surface when the liquid density exceeds the density of substantially water-free oil. By this means, liquid flow over the weir(s) to the off-take pipes occurs only when there is a layer of substantially water-free oil at the liquid surface, and in many situations, it is only possible to ensure that such a layer is formed by providing a very large separating vessel capable of affording adequate residence time for oil to float to, and coalesce at, the liquid surface. In consequence, this type of separation process has only been proposed for the separation of oil from the relatively low water-content mixtures produced from oil wells.

A serious drawback of these well known processes resides in the fact that in the case of treating large quantities of mixture with high delivery, a situation that occurs in particular during the reception of discharged ballast water from large tonnage marine tankers, the dimensions of the separators or separating vessels also become large and their price rises accordingly.

Moreover, the variation of liquid density with depth in the separators or separating vessels tends normally to be very gradual, at least initially, in the case of oily ballast water discharged from marine tankers, and the size and cost of the separators or separating vessels, and the space they occupy, must accordingly be further increased.

The present invention aims at remedying these drawbacks, by the use of a separating system making it possible to utilize a conventional large capacity tank as a buffer tank and pre-separator. Better separation is thus obtained and at the same time a reduction in the cost of the installation and operation.

According to one aspect of this invention, there is provided a method of at least partially separating liquids of different densities from a mixture of liquids comprising passing the mixture into a body of liquid contained in a tank, the mixture being passed into the body of liquid beneath the surface thereof, continuously removing a first liquid fraction of relatively low density from the surface of the body of liquid by means of a skimming weir which is maintained by buoyant means within a selected distance beneath the surface, passing the thus removed first fraction to a first fraction receiving zone, and continuously removing a second liquid fraction of relatively high density from the region of the bottom of the body of liquid at least when the concentration of low density liquid in the bottom region is no more than a selected maximum concentration, and passing the removed second liquid fraction to a discharge conduit.

In another aspect, the present invention provides apparatus for at least partially separating liquids of different densities from a mixture of liquids comprising a tank, a skimming weir disposed in the tank, buoyant means for adjustably maintaining the weir within a selectable distance beneath the surface of any liquid contained in the tank, level-regulating means for maintaining at least a predetermined level of liquid in the tank, first conduit means for passing the mixture of liquids into the tank below said predetermined level, second conduit means for removing a first liquid fraction of relatively low density which passes over the weir from the liquid surface, during operation, third conduit means for removing a second liquid fraction of relatively high density from a region of the bottom of the tank, and flow-regulating means for regulating the rate of removal of said second fraction.

The mixture is preferably passed into the body of liquid in the tank at a level below the top of the skimming weir, and preferably below the lowest possible level of the weir, preferably at a speed which avoids the creation or promotion of turbulence in the liquid. The mixture is preferably passed into the liquid substantially horizontally to avoid "short-circuiting" of unseparated mixture directly to the outlets, and it is greatly preferred to pass the mixture into the body of liquid in such a sense as to promote a circular motion of liquid in the tank. The circular motion improves the amount of separation of the higher and lower density liquid fractions and permits the separation to take place in regions which are not adjacent to the position of entrance of the mixture into the body of liquid. Thus, the mixture may be passed into the body of liquid "tangentially" with respect to the intended circular motion of the body of liquid, or equivalently, perpendicularly to a radius drawn from the weir or positions vertically below the weir.

In preferred forms, the weir is circular, and the buoyant means floats in the body of liquid and is adjustably attached to the weir for adjusting the depth of immersion of the weir.

The weir may be constrained for movement along a substantially vertical line at the centre of the tank.

The rate of passage of mixture into the body of liquid will generally exceed the combined rate of removal of the first and second liquid fractions when, e.g. the mixture is oily ballast discharged from a marine tanker, and the level of the liquid surface in the tank will accordingly rise while the mixture is passed in the body of liquid.

The second liquid fraction is preferably removed only when the surface of the body of liquid attains a predetermined level in the tank.

During operation, the mixture may be passed into the body of liquid at very high rates, e.g. hourly rates of at least 12,5% by volume of the volume of the tank, preferably at least 40 vol.%. and possibly 60% to 80% or even more. The actual rate depends on the amount of contamination of one liquid with another liquid in the mixture, but judged by any previous standards, these rates are very high, and exceedingly advantageous not only from the capital and operational costs involved in practising this invention, but also to the tanker operator who can discharge large quantities of tank cleaning water and ballast water over very short periods.

The first fraction is preferably separated in the receiving zone (the top of which is preferably below the said predetermined level) into a low density third fraction and a high density fourth fraction, and the third fraction is recovered (being, in the case of ballast water separation, oil which is pure enough for use at least as fuel), at least part of the fourth fraction being passed into the body of liquid beneath the surface thereof and preferably below the said predetermined level, e.g. the lowest possible level of the weir. The fourth fraction, in the case of ballast water separation, will be water which is of relatively low oil concentration, and the oil concentration will, in most instances, be so low that the fourth fraction could be discharged directly to sewers or into a neighbouring harbour or sea-waters. However, the recycle of the fourth fraction to the body of liquid aids the separation of the first and second liquid fractions in the tank by acting as a buffer volume and a relatively dense diluent for unseparated mixture in the body of liquid. The passage of the fourth fraction is preferably injected tangentially into the body of liquid in the same sense as the tangential injection of the incoming mixture.

Floating material which may tend to block the weir or the first fraction offtake may be filtered off by, e.g. filter screens around the weir. Viscous and meltable solid material which might cause blockages may be heated, e.g. by steam heating coils in the vicinity of the weir.

In order that there is always maintained a body of liquid in the tank when the apparatus of the invention is to be used, the third conduit means into which the second fraction passes, during use, preferably comprises a conduit providing an overflow weir at a level above the said predetermined level, whereby the second fraction can only pass out of the tank when the level of the overflow weir is at least reached. A valve may be provided in the third conduit means between an outlet from the region of the bottom of the tank and the overflow weir for regulating the flow of the second fraction.

The weir is preferably provided by the lip of a funnel attached to a float of inverted conical form having its apex pointing into the funnel so that if the liquid density at the surface should decrease, the resultant increased immersion of the weir is mitigated by the increased volume of cone which provides buoyancy. The overall buoyancy of the weir system is determined by one or more other floats which can be raised and lowered relative to the lip of the weir.

The weir is preferably constrained for vertical movement by at least one pair of tubes extending vertically and which telescope into each other and which form part of the second conduit means. There may be sealing or packing glands between interacting parts of these tubes. The said predetermined level at which liquid is maintained in the tank, when operational, is set by the lowest level to which the weir can descend, since the weir is always submerged when floating, and the lowest level is conveniently set by the lowest distance to which the lip of the funnel is capable of falling before the telescoping of the tubes has taken place to the greatest extend.

It will be appreciated that once the tank has received the whole of the liquid mixture, the separation can proceed without the use of pumps, liquid circulating by hydrostatic head in the apparatus of the invention, with the exception of any fourth liquid fraction recycled to the tank for which some pumping power will generally be necessary.

Thus in a preferred embodiment according to the present invention a floatable spout for recovering hydrocarbons is arranged in a cylindrical tank of adequately large dimensions, conferring on the tank the functions of buffertank and pre-separator. This floatable spout, which is connected to a discharge conduit for the recovered hydrocarbons, is connected to the top of a mobile tube capable of sliding in a fixed vertical tube and fitted at its upper end with a funnel or similar device for the recovery of the hydrocarbons. The funnel has flotation tanks and peripheral floats. A polluted water inlet is arranged, for preference tangentially in relation to the cylindrical tank, and in the lower half of its height, and a central water outlet at the bottom of the tank is connected by an outlet pipe, fitted with a regulating valve, to an outside overflow.

The invention will now be described by way of example only, with reference to the accompanying drawings in which.

Figure 1:
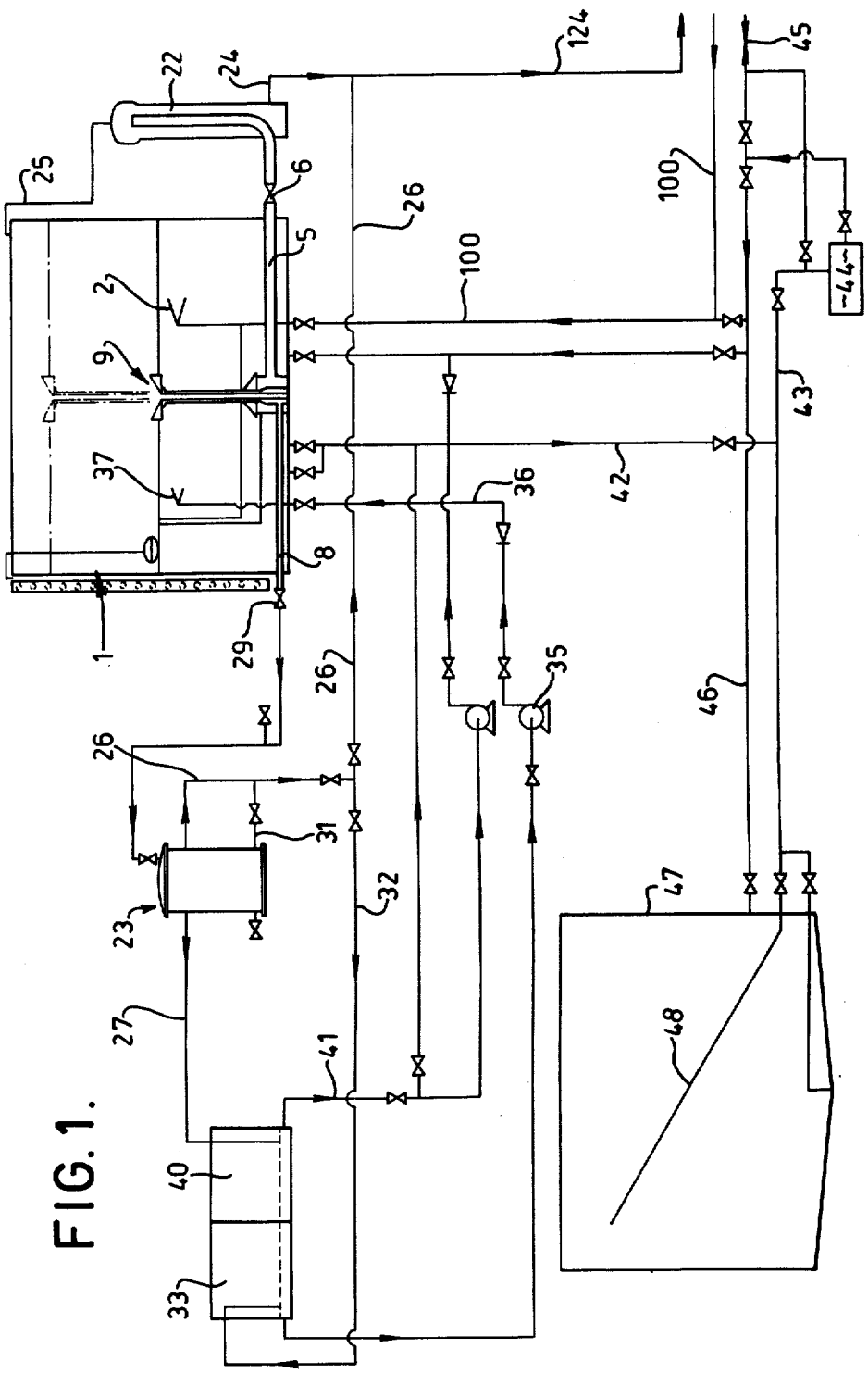
FIG. 1 shows schematically a ballast water separating plant.
Figure 2:
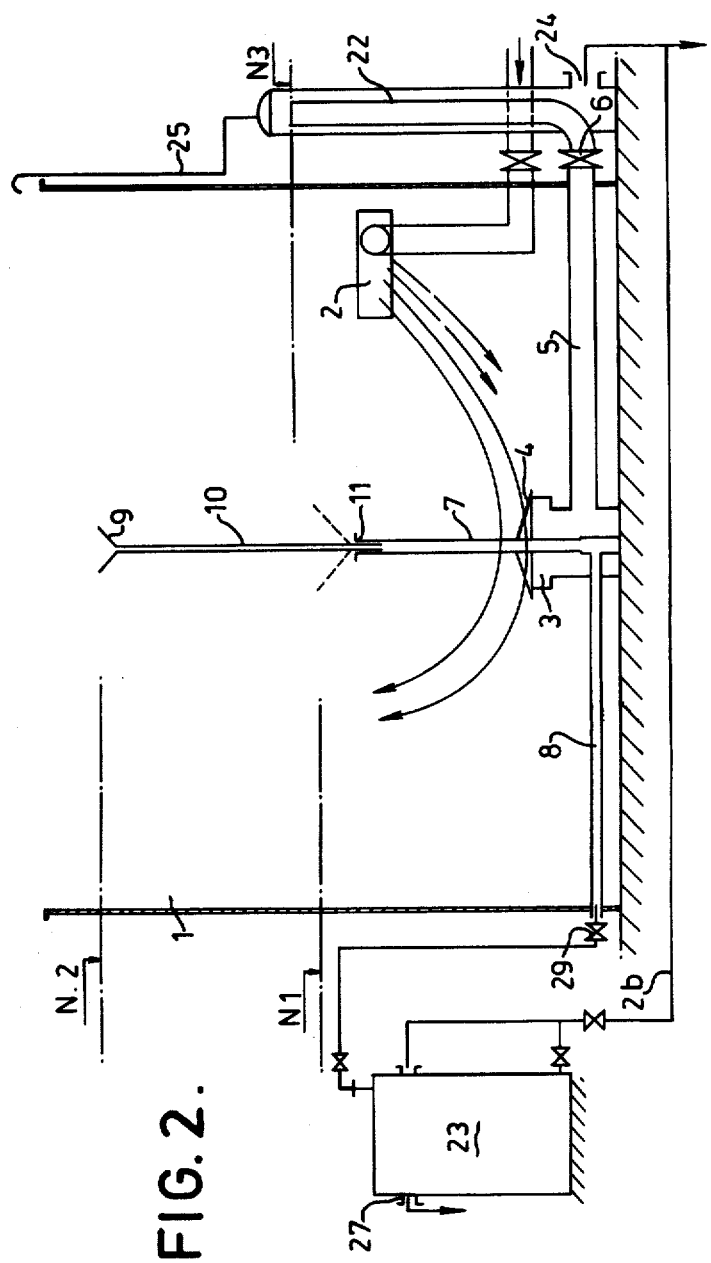
FIG. 2 shows part of the plant of FIG. 1.

FIGS. 1 and 2, particularly FIG. 2, show the arrangement of a large dimension tank 1 adapted to function as a buffer and pre-separator tank. This large capacity tank 1 is fitted with a polluted water inlet 2 which is for preference tangential and disposed within the lower half, and with a central water outlet 3 placed for preference on the axis of the tank 1 and protected by a disc 4 which acts as a roof. To the water outlet 3 is connected a pipe 5 fitted with a regulating valve 6 and leading to an outlet column 22. The latter, which acts as a fixed level overflow or spillway, consists of a vertical pipe upwardly extending from a location downstream of the valve 6 and surrounded by a pipe which is concentric to it. This pipe has at its base an outlet tube 24 for the water-enriched fraction separated from hydrocarbons and on its upper part a syphon-breaker pipe 25 ending above the edge of the tank 1. In the centre of the water outlet 3 and on the axis of the tank 1 is placed a tube 7 which passes through the roof 4 and in which slides another tube 10 carrying at its upper end a floating funnel 9 which enables the hydrocarbons to be collected. A stuffing box 11 may be provided to prevent leakage through the sliding joint between the tubes 7 and 10 although if the tubes 7, 10 are fairly close fitting, any such leakage in the absence of a stuffing box would be small and acceptable. The pipe 8, which is connected to the lower part of the tube 7 passes the recovered hydrocarbons-enriched fraction to a static separator 23. The pipe 26 of the separator 23 serves for the discharge of the residual water and the separated hydrocarbons fraction is recovered via the tube 27.

Figure 3:
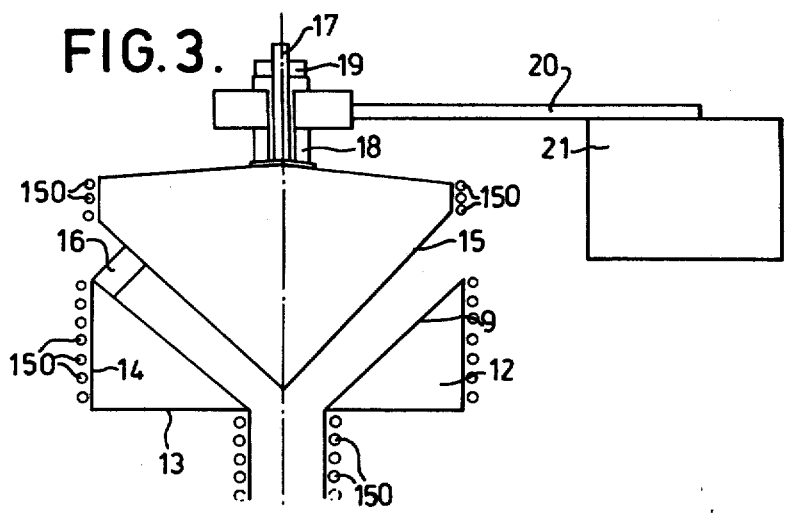
FIG. 3 shows a floating funnel arrangement employed in the plant of FIGS. 1 and 2.

FIG. 3 shows in detail the design of the floating funnel 9 which consists of an inverted truncated cone with a volume greater than that of the float tank 12, consisting of a cylinder of revolution having a base 13 and lateral area 14. The watertight float tank 12 contributes by its volume to the buoyancy of the whole. The funnel 9 is surmounted by an inverted cone 15, which is joined to it by one or more braces 16. At its upper part, this cone 15 is fitted with a vertical threaded spindle 17 carrying, by means of a height regulating wedge 18 and a nut and lock nut 19, three radial arms 20, each arm 20 being connected to a float 21.

Figure 4:
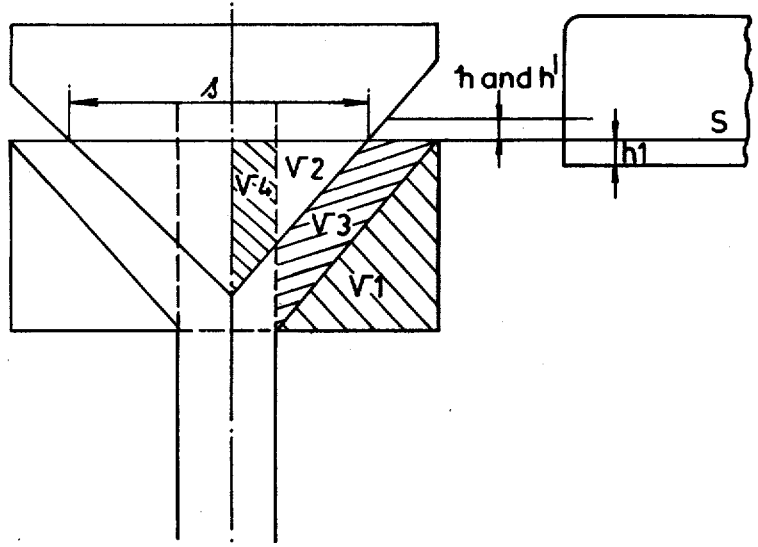
FIG. 4 is a schematic drawing of the arrangement of FIG. 3 in which a number of important parameters are designated.

The limiting balance conditions of the three-float system of FIG. 3 are shown in FIG. 4. P denotes the weight of the mobile assembly, $d$ the density of the mixture in the vicinity of the collecting funnel 9, S the flotation area of the lateral floats, $s$ the section of the upper cone 15 on a level with the funnel overflow, $V1, V2, V3$ and $V4$ the hatched volumes in FIG. 3, $h1$ the draft of the floats when the surface of the liquid just touches the overflow of the funnel, $h$ the height of the liquid above the overflow when the funnel is discharging at full delivery into the pipe 7 when the latter is not completely filled, $h'$ the height of liquid above the tank when the funnel 9 and the tubes 10 and 7 are filled with liquid and the discharge pipe 8 is also full and obstructed.

The following equations can be developed:

$(P/d) = V1 + V2 + V3 + Sh1 + AV$ (With $AV = 0$)  1

$(P/d) = V1 + V2 + Sh + sh$  2

$(P/d) = V1 + V2 + V4 + Sh + Sh' + sh'$  3 from which;

$$h = \frac{AV + V3}{S + s} \quad (4) \quad h' = \frac{AV + V3 - V4}{S + s} \quad (5) \quad (\text{with } h' = 0)$$

$(d \times AV)$ represents the preponderance of weight downwards which makes it possible, when the level of liquid rises and the spout is empty, to cause the latter to float with its lip or weir submerged.

Equation (1) described the equilibrium when no liquid overflows into the funnel while the funnel 9 is floating; Equation (2) represents the normal operating condition, and Equation (3) describes the equilibrium when the outflow of liquid through discharge pipe 8 is prevented by closing the valve 29.

$AV$ must be positive; $h - h'$ represents the total variation of the depth of immersion of the spout during variations in the regulation of the discharge of the recovered hydrocarbons. The calculation of the dimensions of the spout is carried out from the foregoing equations, as well as a check on its stability.

The operation of the tank, floating spout assembly and the external water outlet overflow column of the plant is as follows:

The operation of ballast discharge of the tanker consists generally of several phases. At the commencement of the operation, the tank 1 contains a buffer layer of water or substantially purified water from a previous operation, and whose level N1 reaches the edge of the funnel 9 of the hydrocarbon recovery spout. The latter is initially in the low position through the effect of its deadweight, and is on a level with the water surface and is prevented from descending below that position by stops. The greater part of the ship's ballast, which is partially separated from the hydrocarbons from its residence in the vessel's tanks, is pumped at a high delivery rate to the tank 1. The liquid level therefore rises in the latter and the spout is immediately floated upwards. The submerged lip of the funnel 9 recovers the hydrocarbons rich layer floating on the surface. When the liquid level reaches N3, discharge to the drain through the pipe 24 of a large delivery of substantially oil-free water becomes possible by opening the valve 6. According to the rate of delivery of polluted water into the tank 1, the level will usually tend to fluctuate a little above N3. The spout, consisting of tube 10 and funnel 9, therefore follows the level of the liquid, while having the overflow of the funnel 9 immersed or submerged by a distance fluctuating between $h$ and $h'$, according to the regulation below the recovery point by for example, valve 29. The mixture thus collected is passed by the pipe 8 to a low delivery static separator 23, which completes at least to a greater extent the separation of the water and the hydrocarbons. The separator 23 may be of any type capable of promoting separation of the light and heavy components of a liquid mixture. A preferred type is that described in British Pat. No. 1,165,128.

When the vessel's tank is almost empty, the degree of pollution of the mixture pumped to the tank 1 increases very rapidly, but the rate of pumping of water is generally diminished. The valve 6 can then be closed or left very slightly open, entailing an increase in the level of liquid in the tank 1 from N3 to N2. Separation then takes place with great efficiency in the upper half of the tank 1. The mixture on the surface continues to be skimmed. It is possible to continue skimming with a reduced rate (by leaving valve 29 partially open) after the deballasting of the ship has ceased and the ship has departed, in accordance with the difficulties of separation, owing to the fact that the volume of the liquid in the tank 1 acts as buffer.

Referring now to FIG. 1, the hydrocarbons-rich fraction which has been skimmed off from the liquid surface in tank 1 by the spout/funnel arrangement 9 and passed via control valve 29 to the separator 23 is separated in the latter into a heavy or dense liquid fraction, which will be water of a quality which is adequately high for discharge to sewers or to a neighbouring harbour, dock or to the sea, and a light or low density fraction, which will be hydrocarbons of a quality which is adequately high for use at least as a boiler fuel. Preferably the top level of separator 23 is below level N1 of tank 1 so that the liquid flows to the separator under the action of the hydrostatic head difference.

The water fraction is discharged from separator 23 via line 26, and by appropriate adjustment of the valves at the junction of lines 26 and 32, the water fraction may be passed either to a main water discharge conduit 124 in admixture with water from conduit 24, or alternatively, it may be wholly or partly passed into line 32 for temporary storage in a water receiving tank 33, which provides a buffer or surge volume.

Water is removed, preferably from near the bottom of the water receiving tank 33 via line 34 and pumped by pump 35 via line 36 into the tank 1 at a level below the minimum liquid level N1 in tank 1. The thus recycled water is discharged into tank 1 through a nozzle 37 in a substantially horizontal direction which is generally tangential with respect to the cylindrical walls of the tank 1 (i.e. perpendicular to a radius drawn from the spout 9) and in the same sense as the tangential entry of polluted ballast or cleaning water from the nozzle 2. The nozzle 37 is preferably at about the same level as the nozzle 2, and when no liquid enters through nozzle 2, the recycle of water serves to dilute the polluted liquid already in the tank 1 and to increase the total liquid volume, thereby to utilize, as far as is conveniently possible, the buffer or surge volume capability of the tank 1.

The liquid recycled via nozzle 37 should pass into the liquid layer in tank 1 at such a rate that, as far as possible, turbulence is avoided so that the risk of hindering separation by remixing and promoting emulsion formation is minimized. Generally speaking, the speed of entry of liquid from the nozzles 2 and 37 should be uniform across the open discharge cross-section of the nozzles, and turbulence is avoided at velocities of less than 1 meter/second, e.g. 0.7 m/s. If this order of velocities cannot be achieved with one each of nozzles 2 and 37, it may be preferable to employ more than one of each. When desirable or necessary, solids and sludge may be removed from the bottom of separator 23 via line 31.

The oil fraction separated in separator 23 is passed via line 27 to an oil surge or buffer tank 40. In normal operation, the oil fraction is withdrawn via line 42 into line 43 by pump 44, and by suitable adjustment of the valves in lines 43, 45 and 46, the oil fraction may be discharged directly via line 45 to an oil offtake, or sent to store in a reservoir 47 via line 46 until it can be discharged via line 45. Within the reservoir 47, the oil removal is preferably effected from near the surface of the oil by a swing pipe 48 which may be mechanically elevatable or preferably arranged to be buoyant so that oil discharged via pipe 48 to line 43 and 45 is of the lowest specific gravity and hence more likely to be free of water and of water-oil emulsions.

In a plant of the type described above, the tank 1 had capacity, up to the level N2, of 2530 m$^3$ (about 2530 tonnes), the various levels of FIG. 3, relative to the base of tank 1, being: N1 = 6.20 m., N2 = 11.24 m and N3 = 7m. The entrance nozzle 2 had a vertical opening of about 40 cms. and a horizontal opening of about 1 m 80 cms. to provide a ballast entrance velocity of about 0.7 meters/sec at the maximum discharge rate to be expected from the ballast water discharge pumps. Three equiangularly-spaced apart floats 21 were employed to maintain the buoyancy of the spout 9 with a weir immersion depth of about 5 cms., giving an overflow of 250 m$^3$/hr. All operations, including monitoring levels and water quality, were managed by one man, although collaboration between the plant operator and the ship was carried out by another man. Tankcleaning water and slops containing 15% oil from large oil tankers was discharged into the tank 1, in one non-experimental operation, at a rate of 1080 tonnes/hour, and although this rate is 42.5% of the total liquid capacity of tank 1, the oil content of water leaving line 24 was mainly between 10 and 20 ppm. In trials in which recycle of water (for example, at 250 tonnes/hour) from the separator 23 was employed, the oil content of the discharged water was exceptionally low, being less than 10 ppm, and in comparison to prior plant for separating oil and water the treatment rate is increased by more than four times for the same tank volume and land area occupied by the plant. Moreover, dirty-water discharge rates of more than 50% volume per hour of the tank capacity have been attained without any significant change in the low oil content of the discharged water.

The oily water which is discharged from tankers often contains oily material which is very viscous or which has a solidifying temperature which is so high that blockage of the weir 9 or of the ducts 7, 10 can occur. To avoid this difficulty, steam or other heating coils 150 may be provided around the weir funnel in any suitable arrangement as shown in FIG. 3.

The invention is not limited to the example represented and described, and various modifications may be made to the described embodiment without departing from the scope of the invention as defined in the claims.

We claim:

1. A method of at least partially separating substantially immiscible liquids of different densities from a mixture of liquids as a body of liquid contained within a tank whose surface level is at least at a minimum level about the bottom of said tank and below a maximum level which is substantially at the top of said tank, comprising the steps of: passing the mixture of liquids into the body of liquid in said tank adjacent to the side of said tank in a substantially tangential direction relative to said body of liquid for promoting circular motion of the liquid in said tank and at a speed which substantially avoids the generation of turbulence in said body of liquid within said tank; continuously removing from the surface of said body of liquid a first liquid fraction of relatively low density at a location below the surface of said liquid by means of a skimming weir which floats within a variable predetermined distance below said surface level of said liquid during operation thereof, said distance being selected such that substantially pure low density liquid is removed; passing the removed first liquid fraction to a first fraction receiving zone; separating said first fraction which is received in said first fraction receiving zone into a low density third fraction and a high density fourth fraction; passing said fourth fraction into the body of liquid in said tank substantially tangentially and in the same circumferential direction as said mixture of liquids is passed into said tank, said mixture and said fourth fraction being introduced at a location below said minimum level to substantially avoid direct flow to the skimming weir; continuously removing from the bottom region of said body of liquid a second liquid fraction of relatively high density at least when the concentration of low density liquid in the bottom region is no more than a selected maximum concentration; and passing the removed second liquid fraction to a discharge conduit.

2. The method according to claim 1 in which said mixture is passed into said body of liquid at an hourly rate of at least 12.5 % of the volumetric capacity of said tank.

3. The method according to claim 1 including heating the surface of the body of liquid in the region adjacent to said weir for preventing blockage of the weir.

4. The method according to claim 1, including the step of passing said mixture of liquids into said liquid within said tank at a level below the top of said skimming weir.

5. The method according to claim 1, including the step of passing said mixture of liquids into said body of liquid at a rate which exceeds the combined rate of removal of said first and second liquid fractions for permitting the level of the surface of said body of liquid to rise as said mixture is passed into said tank.

6. The method according to claim 1 including the step of removing said second liquid fraction only when the level of the surface of said body of liquid within said tank reaches a predetermined level in said tank.

7. The method according to claim 1 including the step of maintaining said skimming weir always below said surface level of said liquid when said liquid surface is above said minimum level.

8. Apparatus for at least partially separating liquids of different densities from a mixture of liquids, comprising in combination: a tank having a body of liquid therein; skimming weir means buoyantly disposed within said tank to float in said body of liquid; means for constraining the vertical movement of said weir means between a predetermined minimum liquid level located above the bottom of said tank and a predetermined maximum liquid level located substantially at the top of said tank, whereby at least said minimum level of liquid is maintained within said tank; adjustable buoyant means operably connected with said weir means for maintaining said weir means within a predetermined operational depth below the surface of said body of liquid in said tank such that during operation a substantially pure first liquid fraction of relatively low density continuously flows into said skimming weir means from the surface thereof; first conduit means for passing said mixture of liquids into said tank below said minimum liquid level in a substantially tangential direction such that said mixture of liquids enters said tank at a speed to substantially avoid the generation of turbulence within said tank; second conduit means for removing the first liquid fraction of relatively low density which overflows into said weir means from the surface of said body of liquid; receiving zone means for receiving said first liquid fraction from said second conduit means and for separating said first liquid fraction into a low density third fraction and a high density fourth fraction; means for passing at least part of the fourth fraction from the receiving zone into said tank below said predetermined minimum level of liquid and in the same tangertial direction as said first conduit means, said first conduit means and said fourth fraction passing means being further arranged below said minimum level to substantially avoid direct flow to the skimming weir; first valve means for regulating the passage of said first liquid fraction from said second conduit means to said receiving zone; overflow means located above said minimum level of liquid and below said maximum level of liquid; third conduit means for removing a second liquid fraction of relatively high density from a region in the bottom of said tank and arranged to convey said second liquid fraction to said overflow means, whereby liquid passes through said third conduit means only when said level of liquid in said tank is at least at the level of said overflow means; and second valve means for regulating the flow of liquid through said third conduit.

9. Apparatus according to claim 8 wherein said weir means is circular.

10. Apparatus according to claim 8 wherein the means for constraining the vertical movement of said weir means comprises a rigid outlet tube attached at one end to said weir means means and a substantially vertical rigid tube fixed to said tank, said rigid outlet tube being vertically slidable relative to said substantially vertical rigid tube, and wherein said rigid outlet and vertical rigid tubes comprise at least part of said second conduit means.

11. Apparatus according to claim 10 wherein the top of the fixed tube limits the lowest level which said weir means can attain.

12. Apparatus according to claim 8 wherein said overflow means is enclosed by an outlet tube having at its top an upwardly extending anti-syphon tube open to the atmosphere, said outlet tube leading to a discharge conduit for discharging said second liquid fraction.

13. Apparatus according to claim 8 wherein said third conduit means includes a closed vertical tube at the base of said tank having at least one horizontal opening in the region of the bottom of said tank for facilitating the passage of said second liquid fraction to said overflow means, and said second valve means in said third conduit means located between said closed vertical tube and said overflow means.

14. Apparatus according to claim 8 wherein said weir means comprises a funnel attached to a float having an inverted conical configuration, the apex of the said float pointing into said funnel, at least one vertically adjustable float attached to the said funnel for permitting adjusting of the depth at which said weir means is immersed beneath said surface of said body of liquid.

15. Apparatus according to claim 8 wherein the top of the first liquid fraction receiving zone is located below said predetermined minimum level of liquid in said tank.

16. Apparatus according to claim 8 comprising first storage means for storing any low density third fraction separated in said first liquid fraction receiving zone, and second storage means for storing any high density fourth fraction separated in said first liquid fraction receiving zone.

17. Apparatus according to claim 8 wherein said weir means is always maintained below said liquid surface when said liquid surface is above said minimum level.

* * * * *